June 27, 1967  G. FISHER ET AL  3,327,649
REMOVABLE GONDOLA CAR ROOF
Filed Jan. 22, 1965  5 Sheets-Sheet 1
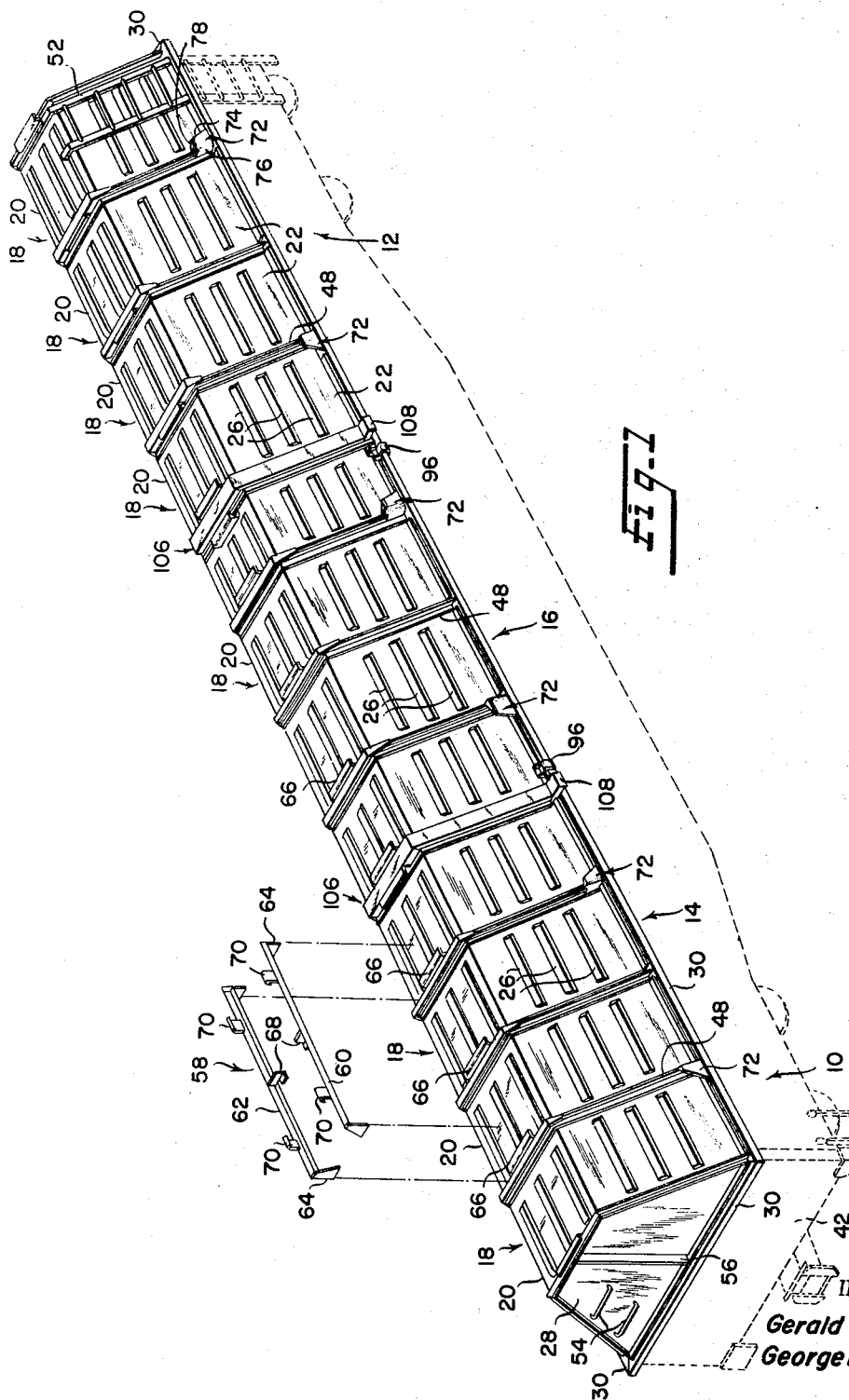

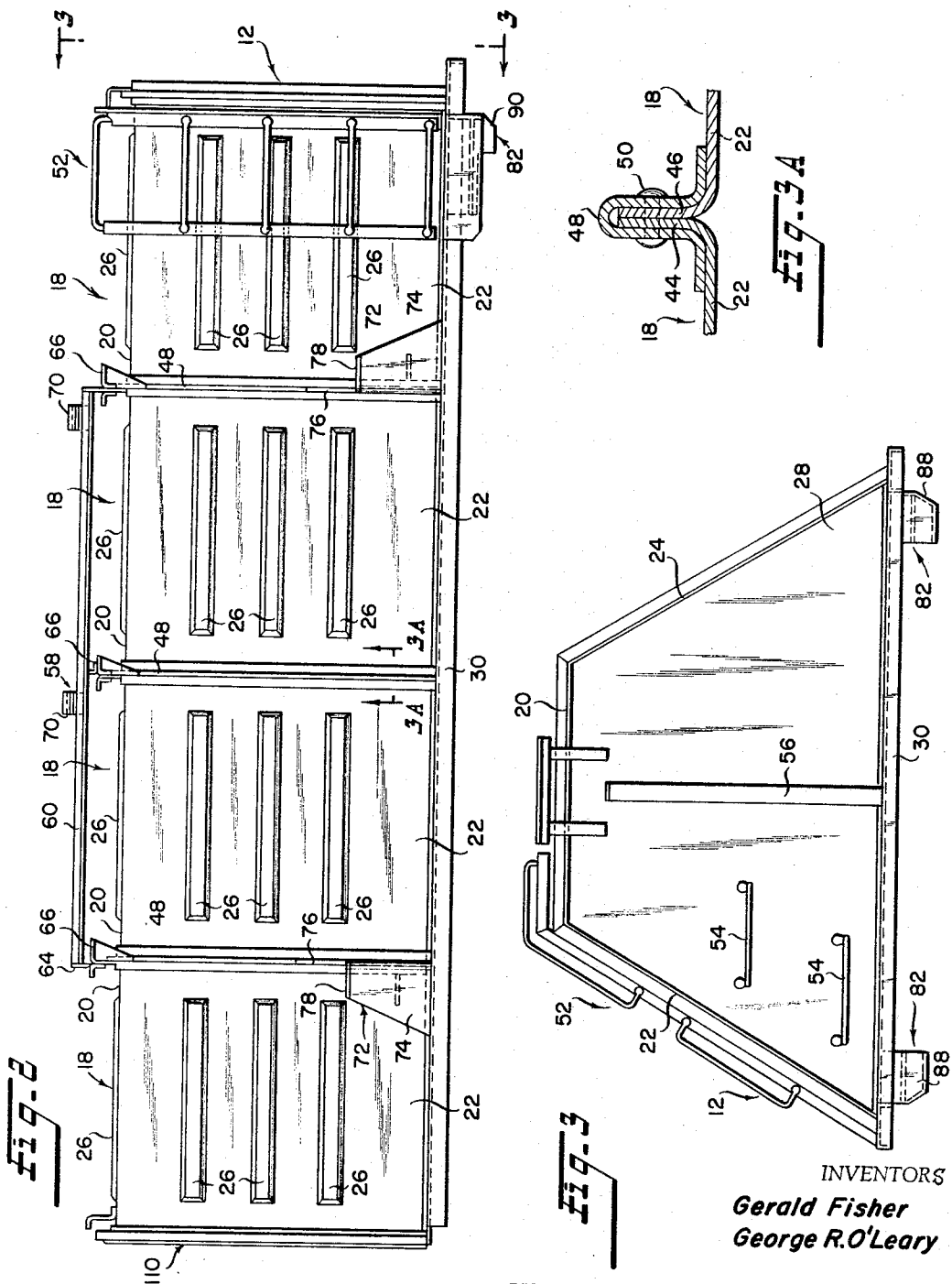

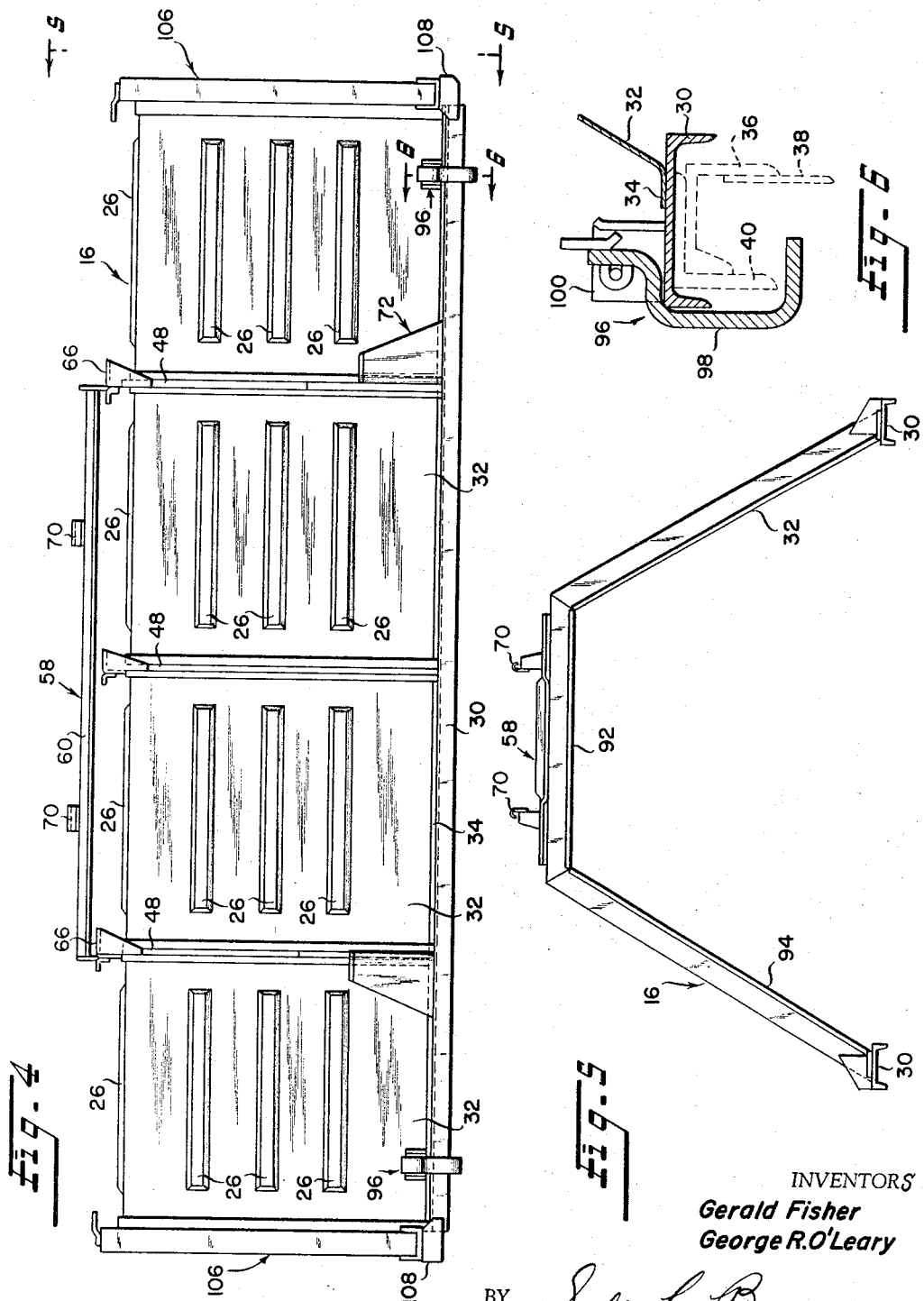

June 27, 1967   G. FISHER ET AL   3,327,649
REMOVABLE GONDOLA CAR ROOF
Filed Jan. 22, 1965   5 Sheets-Sheet 4
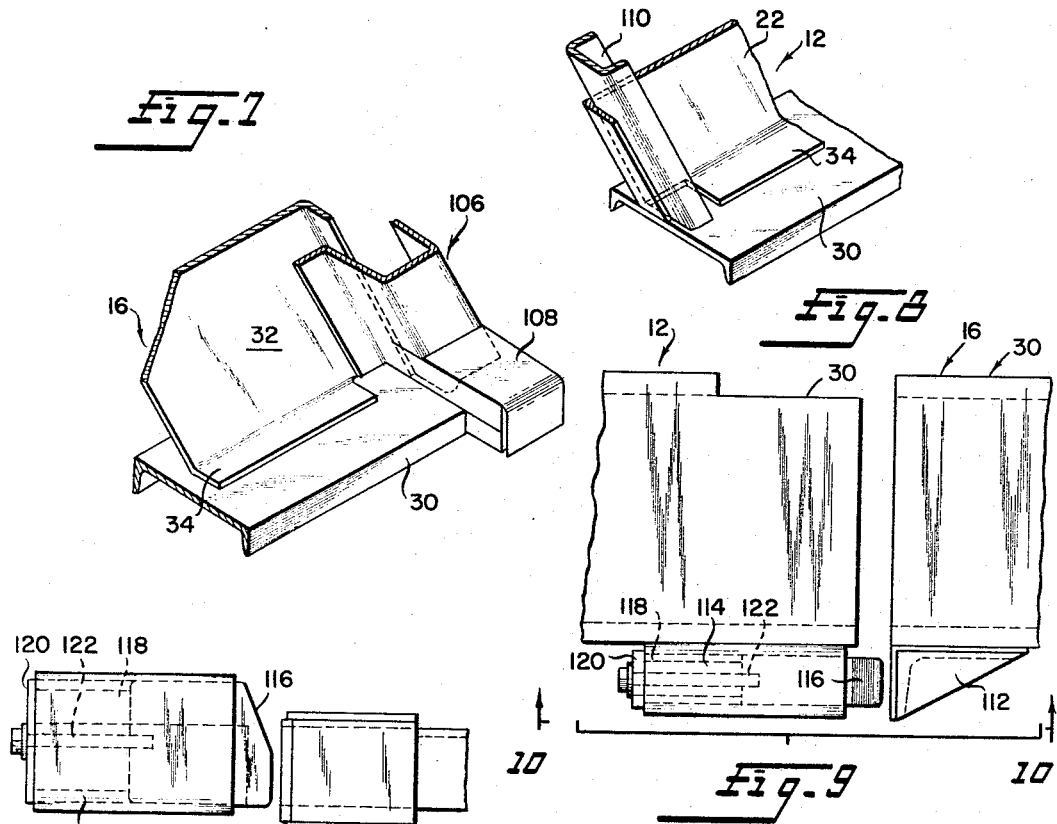
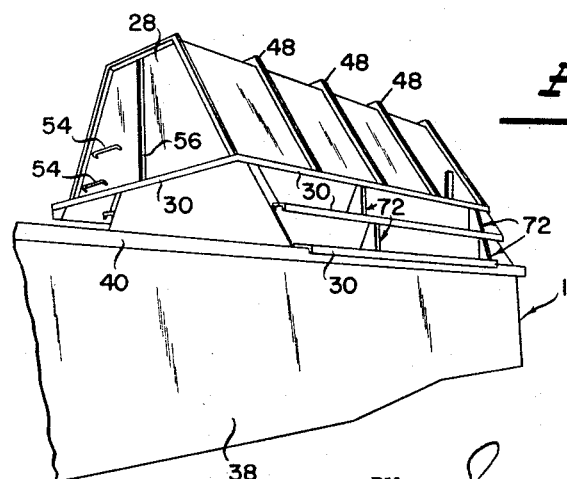
INVENTORS
Gerald Fisher
George R. O'Leary
BY Sabin C. Bronson
ATTORNEY June 27, 1967 G. FISHER ET AL 3,327,649
REMOVABLE GONDOLA CAR ROOF
Filed Jan. 22, 1965 5 Sheets-Sheet 5
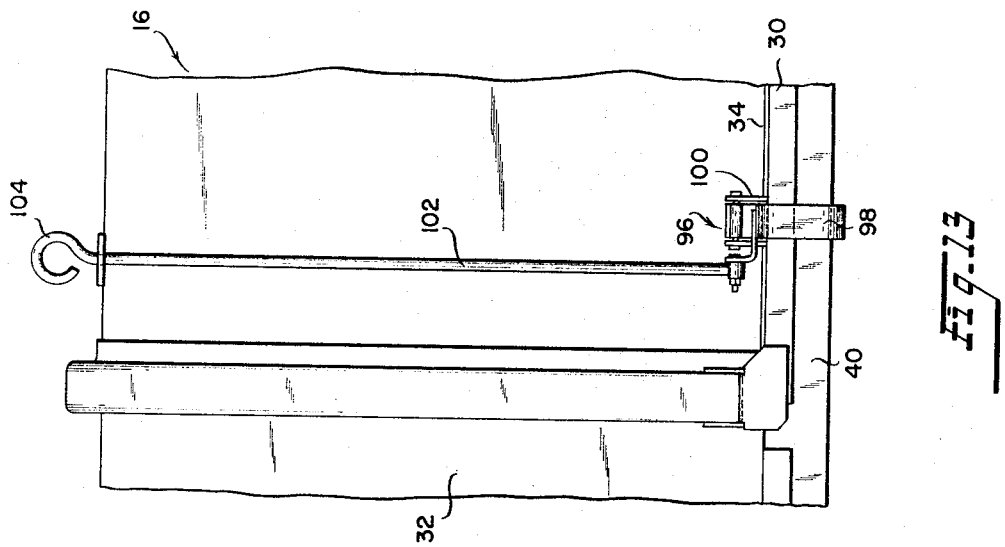
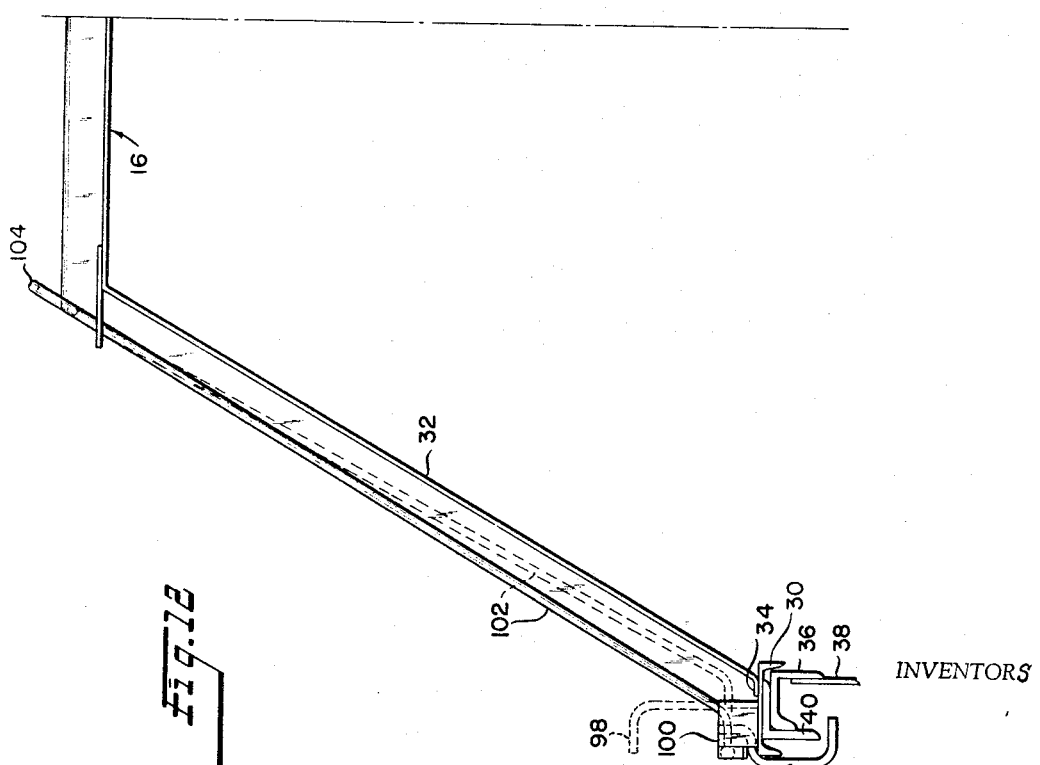
INVENTORS
Gerald Fisher
George R. O'Leary
BY
Sabin C. Bronson ATTORNEY

United States Patent Office 3,327,649
Patented June 27, 1967

3,327,649
REMOVABLE GONDOLA CAR ROOF
Gerald Fisher, Wilmette, Ill., and George R. O'Leary, Highland, Ind., assignors to Stanray Corporation, Chicago, Ill., a corporation of Delaware
Filed Jan. 22, 1965, Ser. No. 427,341
3 Claims. (Cl. 105—377)

This invention relates to roofs for railroad freight cars, and particularly to removable roofs for open-top cars such as gondola cars so that goods may then be shipped in such cars and be protected from the elements and pilfering.

The object of the invention is to provide a readily attachable and removable roof for such cars whereby said cars may be used for the shipment of bulk lading or packaged goods which must be protected from inclement weather, etc.

Another object is to provide such a roof of humpback shape to materially increase the lading carrying volume of the car.

A further object of the invention is to provide a humpback type of roof comprising a plurality of sections, stackable upon each other, each section comprising a plurality of roof sheets joined together at their side margins, and the adjacent ends of the sections being joined together by a weathertight joint which embodies impact absorbing means.

Still another object of the invention is to provide such a roof with spaced locks to releasably hold the roof to the top chord of the car side and to provide means operable from the top of the roof for releasing said locks when it is desired to stack the roof sections for loading, unloading, or other purposes.

Other objects and advantages of the invention will appear in the following description thereof having reference to the accompanying drawings forming part of this application and wherein like reference characters indicate like parts.

In the drawings:

FIG. 1 is a perspective view of a gondola car roof embodying the invention.

FIG. 2 is a side elevation of one of the end sections of the roof.

FIG. 3 is an end view on the line 3—3 of FIG. 2.

FIG. 3A is a section on line 3A—3A of FIG. 2.

FIG. 4 is a side elevation of the center section.

FIG. 5 is an end view on line 5—5 of FIG. 4.

FIG. 6 is a section of one of the locks on line 6—6 of FIG. 5.

FIGS. 7 and 8 are perspective views showing the end of one section spaced from the end of another section and illustrating how the flanges of adjacent sections are overlapping to provide a watertight closure.

FIG. 9 is a top elevation of the impact absorber between roof sections.

FIG. 10 is a side elevation on line 10—10 of FIG. 9.

FIG. 11 is a perspective view showing one end section with the center section and the other end section stacked thereon.

FIG. 12 is an end view of the lock release mechanism.

FIG. 13 is a side view of FIG. 12.

The car roof of my invention comprises a plurality of individual roof sections which are adapted to be secured in end to end abutting relationship on an open top railroad car to protect the lading carried in the car. These sections also carry stacking means whereby one of the sections is adapted to support the other sections in stacked relationship on the railroad car so that a substantial portion of the car is open at the top for loading and unloading purposes.

FIGS. 1 and 11 show the sections disposed to form a roof on a gondola car, generally indicated at 10, and stacked at one end of the car. In the particular embodiment shown in the drawings, there are three roof sections comprising two end sections, generally indicated at 12 and 14, and an intermediate or center section generally indicated at 16. My invention, however, is not restricted to this particular embodiment and it will be understood that additional or fewer intermediate sections may be used between the end sections if required or needed.

Referring now to FIG. 1 of the drawings, it can be seen that each of the roof sections 12, 14 and 16 includes four identical roof sheets which are generally indicated at 18. The size and number of roof sheets 18 can be varied widely to accommodate cars of greater or lesser length. FIGS. 2 and 3 of the drawings show in more detail the structure of the end section 12, and as the structure of end section 14 is identical to that of end section 12, corresponding reference numerals have been applied to both sections 12 and 14. As can be seen in these figures, the individual roof sheets 18 are bent to form a top panel 20 and downwardly divergent side panels 22 and 24. The panels are so formed that in end elevation, as seen in FIG. 3, they have the formation of a truncated triangle. In order to provide the desired strength in the roof section 12, each of the panels 20, 22 and 24 has pressed therein a plurality of corrugations 26. FIG. 3 also shows that one end of the end section 12 is closed by the end panel 28.

At each side bottom edge and at the end of the section 12 which is closed by panel 28, there are downwardly directed metal channel pieces indicated by the reference numeral 30, and the individual panels in section 12 are secured by suitable means, such as by welding, to these channels 30. As the manner of securement of the individual panels to the downwardly directed channel pieces is the same for sections 12, 14 and 16, attention is now directed to FIG. 4 which illustrates the arrangement at the intermediate or center section 16. For ease in description, the channel pieces of this section 16 are likewise designated by the reference numeral 30. As can be seen in FIG. 6, the side panel 32 of section 16 has an outwardly bent flange portion 34 which is secured to the upper face of the channel member 30. Thus, each of the roof sheets 18 in each section of the roof can be easily secured to the spaced channel pieces 30 forming the lower side portions of each section. The end panels of the two end sections 12 and 14 are likewise secured to the channel pieces 30 forming the lower end portion of the respective section.

In FIG. 6 it can also be seen that the top of the side wall of the car 10 comprises a bulb angle 36 which is surmounted on the top edge of the side wall 38 of the car 10. Another angle 40 is secured by suitable means to the top of bulb angle 36 to provide a strong top chord for the side wall of the car. This particular construction is also shown in FIG. 12 of the drawings, and it can be seen in both these figures that the channels 30 at the lower side edges of sections 12, 14 and 16 are adapted to ride in overlapping relationship to this top chord of the car. In the case of the end sections 12 and 14, the channels 30 forming the lower end portion of each section will ride in overlapping relationship to the same type of chord formed at the top of the end walls 42 on car 10.

FIG. 3A shows the manner in which the abutting edges of the respective roof sheets in the roof sections can be conveniently secured together. As seen in this figure, the meeting edges of the side panels 22 of two adjacent roof sheets 18—18 are flanged outwardly in short flanges 44 and 46. The flanges 44 and 46 are secured together by an overlapping seam cap 48 and rivets 50, as is well known in the art. The flanges 44 and 46 are, of course, slit in the bent lines between the panels in each roof sheet and this leaves a V-notch that is covered by said seam cap 48. While FIG. 3A is directed to the one section of adjacent roof sheets 18 in the end roof section 12, it should be appreciated that the three seam caps of each of the roof sections 12, 14 and 16 are this same construction and any suitable method of securing the panels together at their meeting edges can be used with substantially the same result so long as the required strength is provided.

The end roof section 12 is provided with a ladder, generally indicated at 52, on the side panel 22 and with ladder rungs 54 secured in any suitable manner to the end panel 28. There is also a stiffening member 56 which is secured to the end panel 28 by any suitable means such as welding to provide additional strength at the end panel.

FIGS. 1, 2, 4 and 5 of the drawings show a roof lifter assembly, generally indicated at 58, which is provided at the top of each of the roof sections 12, 14 and 16 so that these sections can be lifted by suitable means such as a crane or lift truck. As shown in these figures, the assembly includes longitudinally disposed angle bars 60 and 62 with dependent flanges 64. As can be seen in FIGS. 2 and 4, the angle bars 60 and 62 are longitudinally disposed along the top of roof section 12, roof section 14, and roof section 16, with the dependent flanges 64 secured to the saddle members 66 and associated seam caps 48 in a suitable manner. The inwardly directed flanges 68 on the angle bars 60 and 62 are also secured to saddle members 66. Lifting hook members 70 are provided on each of the angle bars 60 and 62.

As previously indicated, stacking spacers, generally shown at 72, are provided on each of the roof sections 12, 14 and 16 so that the sections may be stacked in the manner illustrated in FIG. 11. These stacking spacers comprise two plate members, one of which, 74, is secured by suitable means such as welding in an upright position on the channel member 30 of the particular roof section, as shown for example in FIGS. 1, 2 and 4. A second plate member 76 is disposed at right angles to the plate 74 and is secured in a suitable manner to the plate 74 and to the associated seam cap 48. A flat plate 78 is horizontally disposed across the top sections of plates 74 and 76 and is secured thereto by welding. As can be seen from FIG. 1 of the drawings, each roof section 12, 14 and 16 has two stacking spacers longitudinally spaced along the lower edge of each of the sections. While not disclosed in the drawings, it should be understood that identical sets of stacking spacers will be positioned along the other side lower edge.

Means for correctly positioning the roof end sections 12 and 14 on the upper section of the gondola car 10 are disclosed at the right-hand portion of FIG. 2 and in FIG. 3 of the drawings. These means include two corner guide stacks generally indicated at 82. The corner guide stacks are fabricated metal structures of generally columnar shape secured by suitable means such as welding to the longitudinally disposed channel pieces 30 at the sides of the particular end roof section, and also to the channel piece 30 at the end of that section. It should be noted that each corner guide stack 82 has sloping wall portions 88 and 90 in two different planes. Sloping wall portions 88 are designed to coact with the top chords on the side walls of the car 10 as the particular end roof section is being lowered in place on the car so that the section will be correctly centered in position on the car. The sloping wall portion 90 is designed to function in a similar manner in conjunction with the top chord of the end wall of the car.

FIGS. 4 and 5 of the drawings show the construction of the intermediate roof section 16, and, as previously explained, many of the details of the construction are similar to those heretofore described in conjunction with the roof end section 12. The corresponding features found in the intermediate roof section 16 have been identified by the reference numerals previously used in conjunction with the description of the end roof section 12. It will be noted that the intermediate roof section 16 does not have any end panel member, and one of the side panel members of a roof sheet 18 has been previously designated with the reference numeral 32 in conjunction with the discussion of FIG. 6. The top panel and the side panel associated with the side panel 32 have been designated by the reference numerals 92 and 94 respectively.

The intermediate roof section 16 does have a set of spaced locking means generally indicated at 96 and disposed on both sides of the roof section along the channel members 30. Referring to FIGS. 6, 12 and 13, it can be seen that the locking means includes a U-shaped latch portion 98 which is pivotally mounted on an upright plate member 100 secured by suitable means to the upper face of the channel piece 30. As shown in these drawings, the lower arm of the U-shaped latch 98 underlies the downwardly projecting leg of the angle 40 so that in this position the intermediate roof section 16 is effectively locked to the upper chord of the gondola car 10. A lever 102 is attached to the U-shaped latch 98 and extends upwardly from the locking means 96 to the top of the intermediate roof section 16 and there terminates in a handle portion 104. With this arrangement the locking means 96 can be operated either from the top of the car 10 or from the track.

Attention is now directed to FIGS. 7 and 8 which show the interlocking arrangement between intermediate roof section 16 and the end roof section 12. While these two figures show the interlocking means between section 16 and section 12 only, it will be understood that similar means are provided at the other end of the intermediate section 16 to interlock with end section 14.

Before discussing the interlocking arrangement between intermediate section 16 and the two end sections 12 and 14, it should be pointed out that in practice the two end sections 12 and 14 are positioned on the car before the intermediate section 16 is placed on the car to interlock with and secure the two end sections. If on the other hand the sections are to be stacked as shown in FIG. 11, then the intermediate section 16 is lifted off the car and deposited on the stacking spacers of one of the end sections, say for example end section 12. After this is accomplished, the remaining end section 14 is lifted off the car and placed on the stacking spacers of the intermediate section 16.

Referring now to FIGS. 1, 4 and 7, it can be seen that at each end of the intermediate section 16 there is a cap member 106 which extends up and over the section from one side channel piece 30 to the opposite side channel piece 30. The cap member 106 is secured to the side panels 32 and 94, and to top panel 92 by suitable means such as welding. As shown in FIG. 7, the cap member 106 is flanged to mate with the outwardly flanged portion of panel 32. Obviously, this same construction can be used with panels 92 and 94 for ease in welding and also to provide a strong joint. It will also be noted that the flange 34 is notched to receive the cap member 106 and that at each lower side of the cap member 106 there is a box-like extension 108 which is designed to receive the end of the channel piece 30 on the adjacent section 12 when the sections are interlocked on the rail car and provide a watertight closure.

Looking next to FIGS. 2 and 8, the end sections 12 and 14 are provided at one end only with a channel member 110 that extends completely around the periphery of panels 22, 20 and 24 from one side channel piece 30 to the opposite side channel piece 30. As shown in FIG. 8, the edge of the panel 22 is flanged and the outwardly bent flange portion 34 is notched to receive this channel member 110. Suitable means such as welding can be used to secure the channel member 110 in place.

If the two end sections 12 and 14 are in place on the top of the gondola car 10, intermediate section 16 can be lowered in placed over these two sections so that cap member 106 will cover and interlock with the channel member 110 and the ends of channel piece 30 on both of the end sections 12 and 14 will be received in the box-like extensions 108 at each end of the intermediate section 16. If then the locking means 96 are engaged with the top chords on the car sides as illustrated in FIG. 6 of the drawings, the three sections of the car roof will be tightly secured to the car and due to the interlock feature between intermediate section 16 and the two end sections 12 and 14, a relatively weathertight joint will be provided between all of the sections.

In FIGS. 9 and 10 there is shown an impact absorber disposed between the intermediate section 16 and the end section 12. A metal striker, generally indicated at 112, is secured to one of the side channel pieces 30 on intermediate sections 16. A housing 114 is secured to the side channel piece 30 of end section 12. An impact nose 116 projects from the end of housing 114 and coacts with striker 112 when there is a relative movement between sections 16 and 12. Immediately behind the nose 116 there is a rubber impact block 118 and a washer plate 120 is welded to the housing at the rear of the impact block 118. The whole assembly is secured together in the housing by bolt 122 that extends through the washer 120, impact block 118 and into the impact nose 116.

Referring again to the locking means 96, shown in FIGS. 6, 12 and 13, it will be observed that opposite ends of the intermediate section 16, on both sides of the car, are provided with said locking assemblies, operable either from the side of the car or from the running board by manipulation of the handle 104 connected at its lower end to the latch portion 98. This connection is such that an upward pull on rod 102 will cause the latch 98 to pivot at least 180 degrees, which throws the weight of the latch over dead center. Then when it is desired to lower the latch, another upward jerk on the rod 102 will start the latch back over dead center the other way and it will then fall by gravity to its locking position shown in FIGS. 6 and 12.

From the foregoing it is apparent that a new type of removable roof for open-top cars has been devised and which can be made in as many sections as necessary.

The operation of the roof is believed obvious to the person skilled in the art of removable gondola car roofs.

What we claim is:

1. In an open top freight car, the improvement comprising, in combination, a roof for said car including a plurality of removable roof sections arranged in end-to-end abutting relation with each other and extending throughout the length of said car, each of said sections having a plurality of roof sheets joined in abutting relationship, each of said sheets being formed along bend lines to produce a top panel and side panels diverging downward from said top panel, the lower extremities of the side panels of each roof sheet being secured to spaced apart channel pieces, said channel pieces being downwardly directed and being so spaced that they can be received over the top edges of the car side walls, the two end sections of said cover each having an end panel disposed tranversely of the top and side panels of said section at one end thereof, said end panel being secured at its lower extremity to a downwardly directed channel piece which is secured between the spaced apart channel pieces and adapted to be received over the top edge of the end walls of said car, said end panels having a structural member (110) secured completely about the inner edge thereof, channel members (106) on the ends of the intermediate section, said intermediate section adapted to be disposed between said end sections with the channel members overlapping the structural members of the end panels, interlocking and forming a weathertight joint therewith, latch means on the spaced apart channel pieces of said intermediate section adapted to selectively latch all of the sections on the car, said roof sheets being provided along their side edges with upstanding flanges, seam caps (48) overlapping abutting flanges of adjacent roof sheets and secured thereto, and lifting assemblies secured to the top portion of each of said sections at spaced seam caps so that when said lifting assemblies are used to move said sections, the total weight of said sections is distributed through said seam caps at the spaced apart points.

2. The cover as set forth in claim 1 including means (88) depending from the downwardly directed channel pieces of each end section to coact with the inside of the car end and side walls when said end section is being disposed on said car, said means being effective to position said end sections in proper position on the side and end walls of the car.

3. In an open top freight car, the improvement comprising, in combination, a roof for said car including a plurality of sections arranged in end to end relationship with each other and extending throughout the length of the car, each of said sections including supporting rails to rest on the top edges of the sides of the car, each section comprising a plurality of sheets having a series of transversely extending corrugations terminating within the sheet, the side edges of said sheets being flanged normal to the sheets, said sheets bent at two points in a direction transversely of the sheets, providing a flat center portion and sloping side portions, the lower margin of the side portions provided with said supporting rails, the flanged sides of adjacent sheets being joined by a weathertight seam and the sections being joined by a weathertight seam, said sections being stackable upon each other for loading said car through the roof area, the two end sections and an intermediate section having impact absorbing means disposed therebetween to cushion impacts between said intermediate section and said end sections due to relative movement therebetween along the top edges of the car side walls; each of said impact absorbing means having a striker fixedly secured to a dependent leg of the supporting rail of said intermediate section, said striker being aligned with an impact member and associated resilient means movably supported in a casing fixedly secured to an adjacent dependent leg on an end section supporting rail extending lengthwise of said car.

References Cited

UNITED STATES PATENTS

| 1,322,310 | 11/1919 | Kring | 105—377 |
| 2,132,328 | 10/1938 | Tatum | 105—377 |
| 2,292,251 | 8/1942 | Test et al. | 105—410 |
| 2,949,867 | 8/1960 | Ramsey | 105—377 |
| 2,977,900 | 4/1961 | Farrar | 105—377 |
| 2,985,118 | 5/1961 | Maharick et al. | 105—377 |

ARTHUR L. LA POINT, *Primary Examiner.*

DRAYTON E. HOFFMAN, *Assistant Examiner.*